United States Patent [19]

Ichimura

[11] Patent Number: 4,493,988
[45] Date of Patent: Jan. 15, 1985

[54] ODOMETER USING AN ELECTRIC MOTOR DISPOSED WITHIN ANNULAR FIGURE WHEELS

[75] Inventor: Etsuo Ichimura, Omiya, Japan

[73] Assignee: Kanto Seiki Co., Limited, Omiya, Japan

[21] Appl. No.: 275,713

[22] Filed: Jun. 22, 1981

[30] Foreign Application Priority Data

Jul. 11, 1980 [JP] Japan .............. 55-97936[U]
Feb. 16, 1981 [JP] Japan .............. 56-20297[U]
Apr. 3, 1981 [JP] Japan .............. 56-48178[U]

[51] Int. Cl.$^3$ .............................................. G01C 22/02
[52] U.S. Cl. .................................... 235/96; 73/490; 324/167; 340/815.08; 235/139 R; 235/98 B
[58] Field of Search ............. 235/95 R; 324/167, 171, 324/174; 73/490, 519, 310; 340/815.08, 815.09

[56] References Cited

U.S. PATENT DOCUMENTS

| | | | |
|---|---|---|---|
| 1,252,622 | 1/1918 | Smithey | 235/95 R |
| 2,074,066 | 3/1937 | Wheeler | 340/815.08 |
| 2,375,383 | 5/1945 | Potts | 340/815.09 |
| 3,541,363 | 11/1970 | Vettermann et al. | 310/49 A |
| 3,659,780 | 5/1972 | Woodward | 235/95 R |
| 3,909,646 | 9/1975 | Haydon | 310/83 |
| 3,935,996 | 2/1976 | Kleinbohl | 235/95 R |

FOREIGN PATENT DOCUMENTS

| | | |
|---|---|---|
| 0024647 | 8/1980 | European Pat. Off. . |
| 0024647 | 3/1981 | European Pat. Off. . |
| 1215411 | 4/1966 | Fed. Rep. of Germany . |
| 1192428 | 5/1965 | Fed. Rep. of Germany . |
| 1460749 | 10/1965 | France . |
| 802955 | 10/1958 | United Kingdom . |

*Primary Examiner*—Joseph A. Orsino, Jr
*Assistant Examiner*—Timothy K. Greer
*Attorney, Agent, or Firm*—Schwartz, Jeffery, Schwaab, Mack, Blumenthal & Koch

[57] ABSTRACT

In a highly compact odometer an electric motor which drives a mechanical display thereof, is disposed within the set of annular figure wheels used in the display and drivingly connected to said wheels through a worm and worm wheel drive train. In the case of integrated "total" and "trip" odometers a multipole rotor having a torque capacity adequate for driving both odometers is disposed within the set of figure wheels used for the "total" odometer display while the coil is disposed within the "trip" odometer set. Yokes extend between the sets of wheels to provide a magnetic connection between the coil and rotor. To prevent reversing of the odometer and gear chatter in the drive train a one-way clutch type bearing is used to support the output shaft of the electric motor.

9 Claims, 3 Drawing Figures

ODOMETER USING AN ELECTRIC MOTOR DISPOSED WITHIN ANNULAR FIGURE WHEELS

BACKGROUND OF THE INVENTION

1. Field of the Invention

The present invention relates generally to an odometer for a wheeled vehicle or the like and more particularly to a highly compact electrically driven odometer having a mechanical display.

2. Description of the Prior Art

In a previously proposed automotive odometer a flexible shaft has been used to interconnect the display drive mechanism of the odometer through a multi-stage reduction gear to a rotatable member of a part of the drive train of the vehicle. However, this arrangement has suffered from the drawback that it is becoming increasingly difficult to find sufficient space in the crowded environment behind the dash and instrument panels of the vehicle and in the engine room of the vehicle for the provision of the cable due to the implementation of such measures as exhaust gas purification controls and the like. One attempt to solve this problem has been to provide an electric motor of either the stepping or DC type for driving the mechanical display of the odometer through a suitable gearing and feeding this motor a suitable energizing signal such as train of bipolar pulses indicative of the vehicle speed. However, due to the necessity of providing the motor adjacent the plurality of figure wheels utilized in the display, this arrangement has suffered from the drawback of being bulky and accordingly difficult to arrange and install in the instrument panel of the vehicle.

SUMMARY OF THE INVENTION

The present invention features an electric motor of the stepping type (or alternatively a DC type) which is uniquely disposed within a plurality of annular figure wheels on which the distance indicating digits are printed. This of course eliminates the bulkiness of the externally disposed motor of the prior art and accordingly endows on the arrangement a high degree of compactness.

A second feature of the invention comes in the provision of a one-way clutch disposed at one end of the stepping motor output shaft, which both prevents illegal reversing of the odometer and simultaneously prevents rattling of the gears used to transmit the rotational energy from the motor to the figure wheels without affecting the compactness of the arrangement.

A further important feature of the present invention comes in the "separation" of the motor into two components or parts and disposing one of the parts within the set figure wheels utilized in a "total" odometer and the other within a second set utilized in an associated "trip" odometer integrated with the first. Viz., the "separation" takes the form of removing the energizing coil (or coils) of the motor from, within one set of figure wheels (i.e., those of a "total" odometer) and disposing same within a second separate set of the "trip" odometer integrated with the first. The separation of the motor into two parts permits the use of a larger rotor having an increased number of poles and torque output and which does not demand an increase in the diameter of either of the two sets of figure wheels which would be otherwise required to house a conventionally arranged motor having the same torque capacity.

BRIEF DESCRIPTION OF THE DRAWINGS

The features and advantages of the arrangements of the present invention will become more clearly appreciated from the following description taken in conjunction with the accompanying drawings in which like reference numerals are used to designate corresponding elements, and in which.

DETAILED DESCRIPTION OF THE PREFERRED EMBODIMENTS

Figure 1:
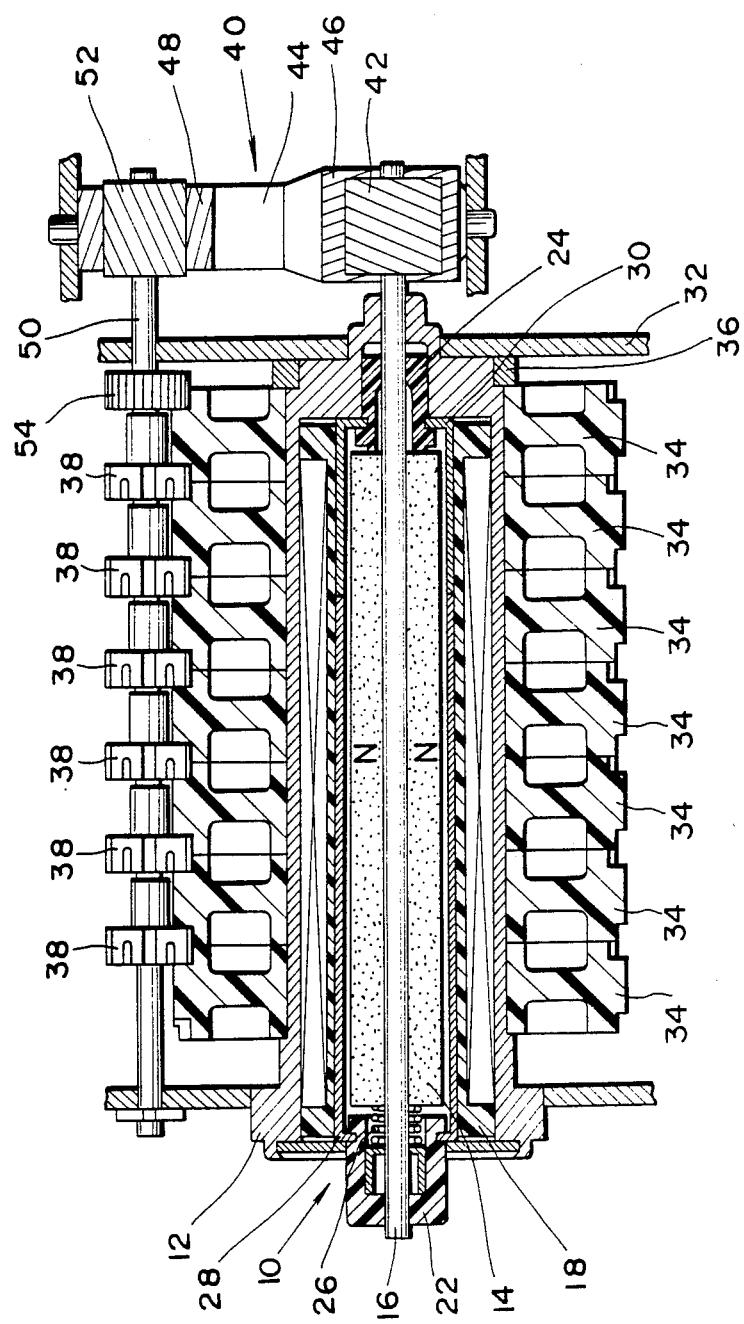
FIG. 1 is a sectional elevation of an odometer according to a first embodiment of the present invention.

Turning now to the drawings FIG. 1 shows a first embodiment of the present invention. In this figure an electric motor 10 has a soft-magnetic cylindrical housing 12. In this case the motor 10 is of the stepping type and includes a permanent magnetic four pole rotor 14 which is supported on and fixedly attached to an output shaft 16. Disposed about the rotor in a spaced coaxial relationship therewith and snugly fitted within the cylindrical housing 12, is a synthetic resin bobbin 18 on which an energizing coil 20 is wound. Bearings 22 and 24 are disposed at each end of the cylindrical housing 24 and serve to support the output shaft 16 of the motor 10. A spring 26 is disposed within a hollow of the bearing 22 and slidingly contacts one axial end of the rotor to bias same toward and against the other bearing 24. Stator poles 28 and 30, each having 2 tapered pole members, are disposed between the rotor 14 and the inner periphery of the bobbin 18.

The cylindrical housing 12 is supported on a speedometer chassis 32 which may be attached to or form part of an instrument panel or the like. A plurality of figure wheels 34, in this case 7, are rotatably supported on the external periphery of the cylindrical housing. As shown, the housing is suitably stepped at one end to retain the figure wheels thereon while the other end receives a removable retaining ring 36.

A series of drive pinions 38, in this case 6, are each arranged to mesh with two adjacent figure wheels in a manner that upon a full rotation of one wheel the next will be rotated through a distance sufficient to bring the next digit printed thereon into the display window (not show).

A drive train generally indicated by the numeral 40, operatively interconnects the output shaft 16 of the motor 10 with a first of the figure wheels 34. This drive train takes the form of a worm 42 carried on one end of the output shaft, a drive shaft 44 having a worm wheel 46 and a worm 48 thereon (worm 42 being arranged to mesh with worm wheel 46) and a input shaft 50 having a worm wheel 52 on one end which meshes with the worm 48 and a spur gear 54 on the other. On the input shaft 50 the drive pinions 38 are rotatably supported. The spur gear 54 meshes with the first of the figure wheels 34.

In operation, the coil 20 is fed via terminals (not shown) a suitable energizing signal which in this case takes the form of a bipolar square wave pulse. This induces the rotor 14 to stepwisely rotate. This rotation is transmitted through the gear train 40 inducing the rotation of the first of the figure wheels, which in turn, upon a full rotation sequentially drives the next figure wheel and so on.

Figure 2:
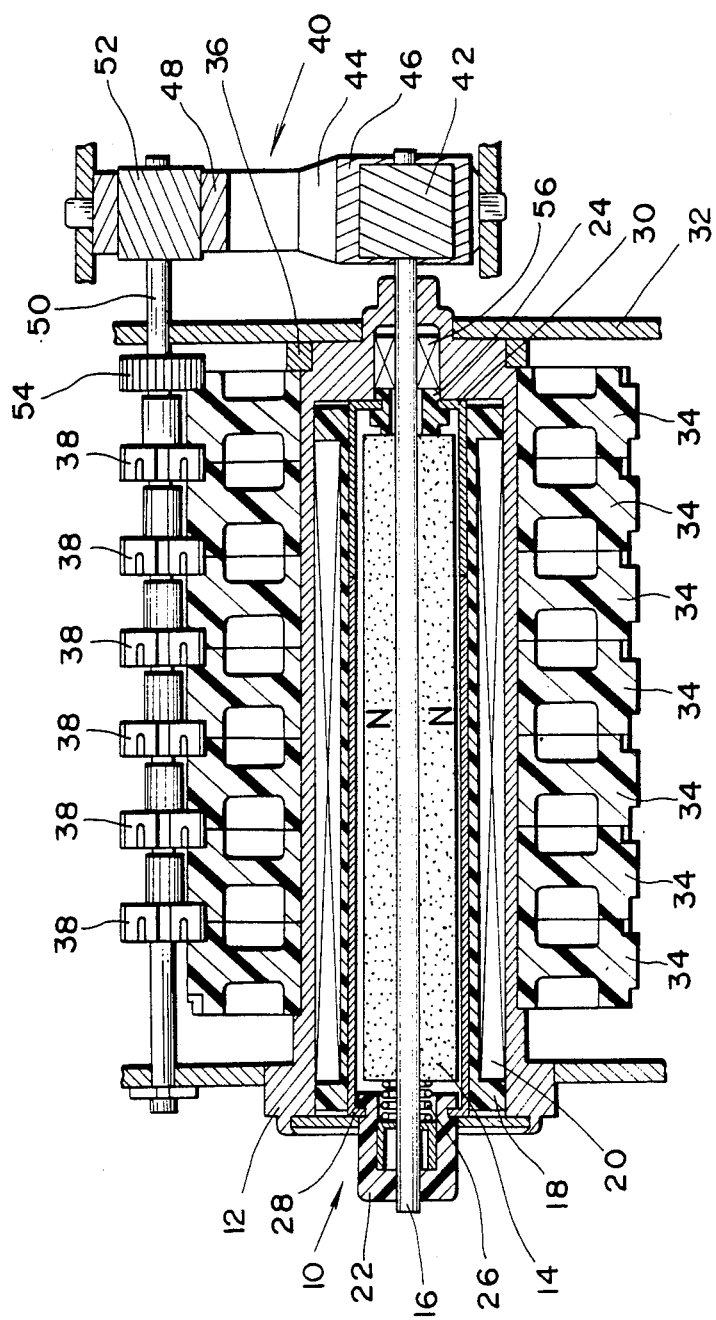
FIG. 2 is a sectional elevation similar to FIG. 1 but showing the provision of a one-way clutch arrangement therein.

FIG. 2 shows a modification of the first embodiment wherein the output shaft bearing 24 is partly replaced with a bearing 56 which has a one-way function. This one-way bearing 56 of course prevents any unwanted and/or illegal reversing of the odometer and simultaneously serves to prevent any chatter in the gear train 40 while not impairing the compactness achieved by the first embodiment in any way. The remaining construction and operation of this arrangement is identical with that of the previously disclosed arrangement and as such no further description of same is deemed necessary.

Figure 3:
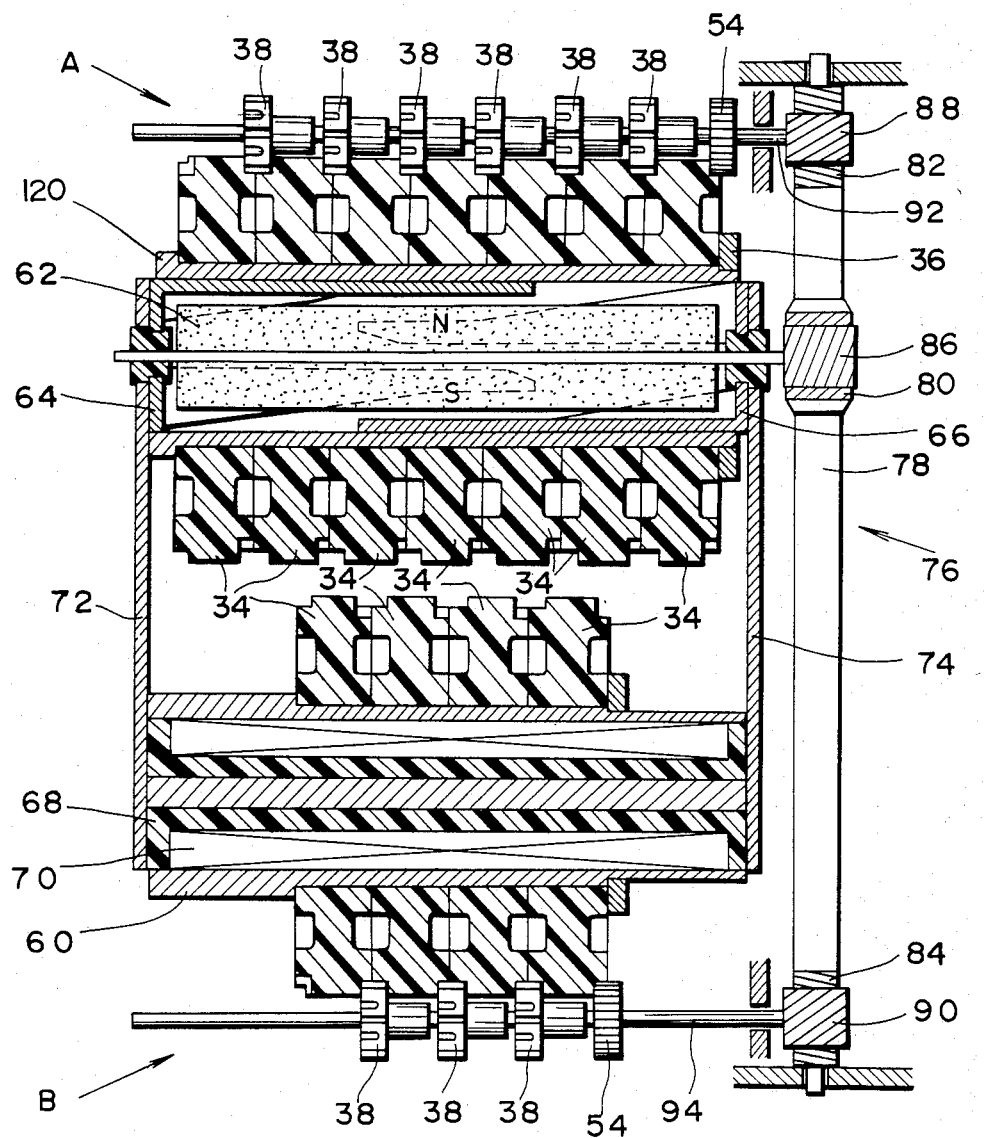
FIG. 3 is a sectional elevation of a second embodiment of the present invention wherein an enlarged rotor of the electric motor is disposed within the figure wheels of the "total" odometer and the energizing coil thereof is disposed within the figure wheels of the associated "trip" odometer.

FIG. 3 shows a second embodiment of the present invention. In this case the invention takes the form of an arrangement having integrated "total" and "trip" odometers.

In this embodiment in order to provide sufficient torque to drive both odometers, the electric motor 10 is "separated" into two. Viz., in this case a first cylindrical housing 120 (non-magnetic) of the "total" odometer A, receives the rotor and stator poles while a second cylindrical housing 60 (non-magnetic) of the "trip" odometer B, receives the energizing coil and bobbin which, in the former embodiment were disposed coaxially about the rotor.

The construction of the "total" odometer is essentially the same as in the case of the first embodiment with the exception that the rotor 62 has six poles and the two stator poles 64 and 66 are of the so called "claw tooth" type each having 3 tapered or tooth shaped pole members. A motor of this type is disclosed in U.S. Pat. No. 3,541,363 issued on Nov. 17, 1970 to Vettermann et al. Reference may be made to this Patent to supplement this disclosure.

The first and second cylindrical housings 120 and 60 are mounted on the speedometer chassis (not shown). The second cylindrical housing 60 snugly receives therein a bobbin 68 on which a coil 70 (or coils) are wound. Magnetically conductive yokes 72 and 74 are arranged to extend from either axial end of the coil 70 and bobbin 68 arrangement to the first cylindrical housing wherein they establish a magnetic connection between the coil 70 and the stator poles 64 and 66. With this arrangement upon energization of the coil 70 the magnetic energy thus produced is transferred to the stator poles 64 and 66 via the yokes 72, 74. This energization of the yokes induces the rotor 62 to rotate. Further, due to the tapered configuration provided on each of the stator pole segments, the rotor is induced to rotate in one rotational direction only. A drive train 76 provides a simultaneous drive connection between the rotor 62 and the two odometers A and B. This drive train to the "trip" odometer B of course includes a reset arrangement, however for the simplicity of presentation this gearing has been omitted from the drawing. The drive train in this case, takes the form of a drive shaft 78 having a worm wheel 80 and worms 82, 84 thereon. Worm wheel 80 meshes with a worm 86 carried on the output shaft of the rotor 62 while the endmost worms 82 and 84, respectively mesh with worm wheels 88 and 90 carried on the respective input shafts 92 and 94 of the odometers A and B. The input shafts 92 and 94 each have spur gears 54 which in turn drive the first figure wheel of the two odometers. Drive pinions 38 sequentially drive the next figure wheel and so as in the case of the first embodiment.

If desired a one-way clutch or bearing such as that used in the arrangement of FIG. 2 may be used to support the output shaft of the rotor 62. This, as in the former arrangement will prevent unwanted reversing of the figure wheels while simultaneously preventing any "chatter" in the drive train.

Thus, in summary the present invention provides a highly compact odometer via the disposition of the electric motor either wholly or in part within the annular figure wheels of the mechanical display and connecting the motor to the figure wheels through a simple worm/worm wheel gear train or the like.

What is claimed is:

1. In an odometer for a vehicle:
    a first essentially cylindrical hollow housing;
    a rotor having a shaft, said rotor being rotatably disposed within said hollow housing and forming part of an electric motor;
    a plurality of rotatable annular figure wheels slidably disposed on the external periphery of said housing, said housing being arranged to pass through all of said figure wheels;
    a gear train drivingly interconnecting said shaft and said plurality of figure wheels for rotating said figure wheels in response to the rotation of said rotor, said gear train including drive pinions which interconnect adjacent figure wheels, said drive pinions being located on the external periphery of said figure wheels; and
    means for inducing said rotor to rotate in response to an electronic signal indicative of vehicle speed.

2. An odometer as claimed in claim 1, further comprising:
    a second essentially cylindrical hollow housing;
    a second plurality of figure wheels rotatably disposed on the external periphery of said second housing; and
    a second gear train interconnecting said shaft with said second plurality of figure wheels.

3. An odometer as claimed in claim 1, wherein said inducing means comprises:
    a coil energizable by said signal which coil is disposed within said first hollow housing coaxially about said rotor; and
    a plurality of stator poles disposed coaxially about said rotor and within said coil.

4. An odometer as claimed in claim 2, wherein said inducing means comprises by:
    a plurality of stator poles disposed within the first said hollow housing;
    a coil energizable by said signal disposed within said second hollow housing; and
    magnetic yokes extending from said coil to said stator poles which yokes provide a magnetic connection between said coil and said plurality of stator poles.

5. An odometer as claimed in claim 1, further comprising a one-way clutch bearing disposed within said first hollow housing for supporting said shaft.

6. An odometer as claimed in claim 1, wherein said gear train comprises:
    a first worm carried on said shaft;
    a first worm wheel meshing with and driven by said first worm;

a second worm synchronously rotatable with said first worm wheel;

a second worm wheel meshing with and driven by said second worm;

an input shaft fixedly connected to said second worm wheel for synchronous rotation therewith; and a spur gear carried on said input shaft which spur gear meshes with a first of the first said plurality of figure wheels.

7. An odometer as claimed in claim 6 wherein said second gear train comprises:

a third worm synchronously rotatable with said first worm wheel and second worm;

a third worm wheel meshing with and driven by said third worm;

a second input shaft fixed to said third worm wheel for synchronous rotation therewith;

a second spur gear carried on said second input shaft which second spur gear meshes with a first of said second set of figure wheels; and a second plurality of drive pinions each interconnecting two adjacent figure wheels for upon a given amount of rotation of one wheel rotating the other wheel by a predetermined amount.

8. An odometer as claimed in claim 1, further comprising a spring for biasing said rotor in one axial direction within the first said hollow housing.

9. In an odometer for a vehicle:

a first essentially cylindrical hollow housing;

a rotor having a shaft, said rotor being rotatably disposed within said hollow housing and forming part of an electric motor;

a plurality of annular figure wheels rotatably disposed on the external periphery of said housing so as to surround that part of said housing in which said rotor is disposed;

a gear train drivingly interconnecting said shaft and said plurality of figure wheels for rotating said figure wheels in response to the rotation of said rotor;

a second essentially cylindrical hollow housing;

a second plurality of figure wheels rotatably disposed on the external periphery of said second housing;

a second gear train interconnecting said shaft with said second plurality of figure wheels;

stator poles disposed in said first hollow housing;

a coil disposed within said second hollow housing; and magnetic yokes extending from said coil to said stator poles which yokes provide a magnetic connection between said coil and said stator poles.

* * * * *